April 14, 1953 D. B. HARRIS 2,635,226

PHASE MODULATION SYSTEM AND APPARATUS

Filed Jan. 20, 1950 6 Sheets-Sheet 1

INVENTOR.
DONALD B. HARRIS
BY John J. Rogan
ATTORNEY

April 14, 1953 D. B. HARRIS 2,635,226

PHASE MODULATION SYSTEM AND APPARATUS

Filed Jan. 20, 1950 6 Sheets-Sheet 2

INVENTOR.
DONALD B. HARRIS
BY John J. Rogan
ATTORNEY

April 14, 1953 D. B. HARRIS 2,635,226

PHASE MODULATION SYSTEM AND APPARATUS

Filed Jan. 20, 1950 6 Sheets-Sheet 3

INVENTOR.
DONALD B. HARRIS
BY John J. Rogan
ATTORNEY

INVENTOR.
DONALD B. HARRIS
BY John J. Rogan
ATTORNEY

April 14, 1953 D. B. HARRIS 2,635,226

PHASE MODULATION SYSTEM AND APPARATUS

Filed Jan. 20, 1950 6 Sheets-Sheet 5

INVENTOR.
DONALD B. HARRIS
BY John J. Rogan
ATTORNEY

INVENTOR.
DONALD B. HARRIS
BY
John J. Rogan
ATTORNEY

Patented Apr. 14, 1953

2,635,226

UNITED STATES PATENT OFFICE 2,635,226

PHASE MODULATION SYSTEM AND APPARATUS

Donald B. Harris, Cedar Rapids, Iowa, assignor to Collins Radio Company, Cedar Rapids, Iowa, a corporation of Iowa Application January 20, 1950, Serial No. 139,711

12 Claims. (Cl. 332—22)

This invention relates to electric signalling systems, and more especially to such systems as employ phase-modulated carriers.

A principal object of the invention is to provide an improved phase modulation signalling system.

Another object is to provide a system of phase-modulated carrier, wherein very wide and signal-controlled phase deviation in the carrier can be procured.

Another object is to provide a system for converting input signal voltages into a phase-modulated carrier, by employing conventional amplitude modulation techniques.

Another object of the invention is to provide novel forms of phase converters.

A feature of the invention relates to a phase-modulated carrier system for producing a very wide signal-controlled phase deviation in the carrier, while maintaining a linear relation between the signal input amplitude and the carrier phase deviation.

Another feature relates to a phase-modulated carrier system, wherein original input signals are converted into two equal-frequency signals of quadrature phase relation, which signals are then used to amplitude modulate, in separate channels, two equal-frequency carriers also of quadrature phase relation and with the amplitude-modulated carriers added, to produce a phase-modulated carrier.

Another feature relates to a phase modulation system employing a sweep oscillator which simultaneously feeds a sine phase converter and a cosine phase converter, to which converters the input signals are also applied to produce, in separate channels, sine and cosine modulating functions correlated with the input signals; and a source of carrier frequency is provided for developing two quadrature phase components which are respectively amplitude-modulated by said sine and cosine functions, and with the amplitude-modulated outputs combined to produce a phase-modulated carrier.

A further feature relates to the novel organization, arrangement and relative interconnection of parts which cooperate to provide an improved phase modulation system.

Other features and advantages not particularly enumerated, will be apparent after a consideration of the folowing detailed descriptions and the appended claims.

Referring to the drawing.

Figure 1:
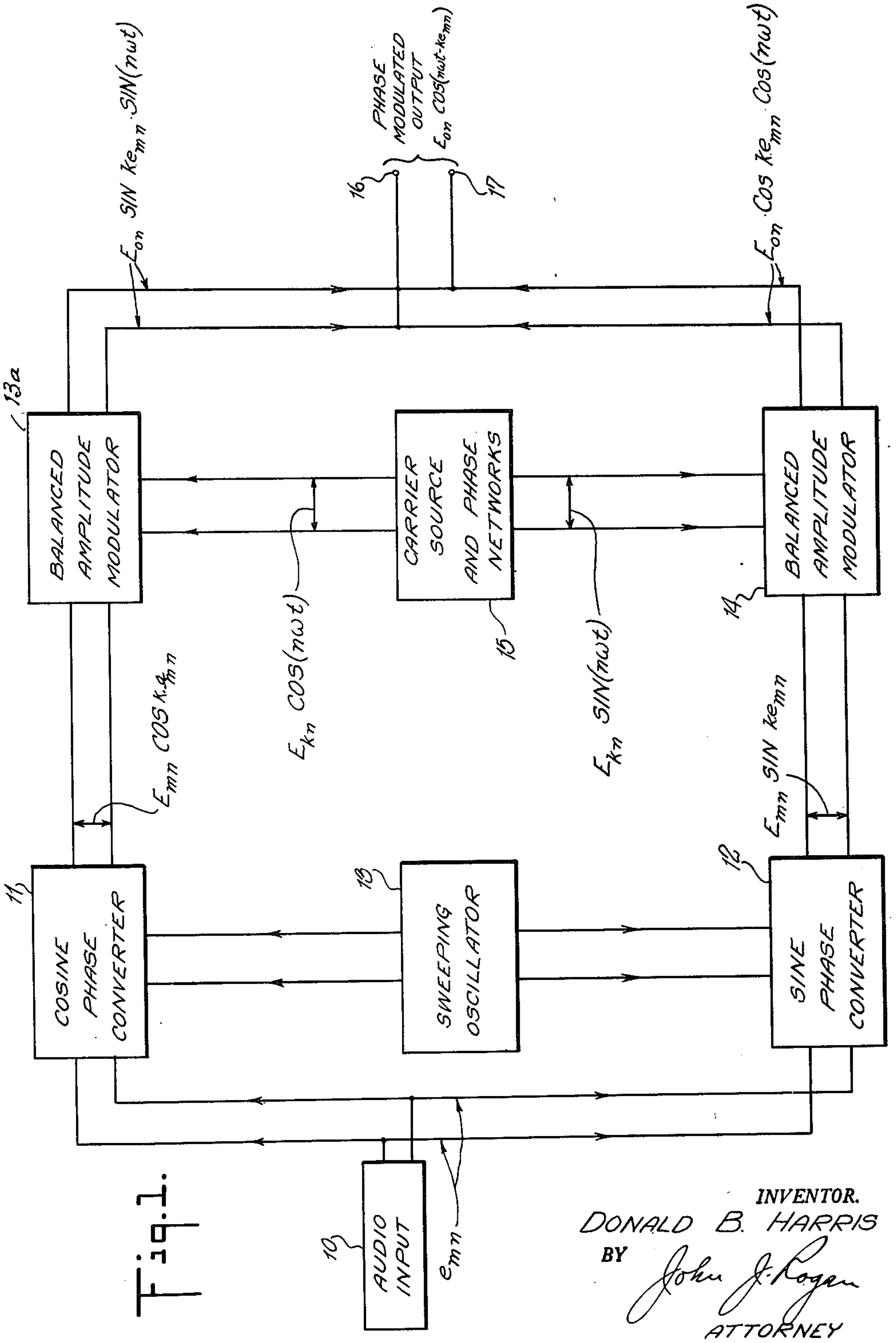
Fig. 1 is a schematic showing, in block diagram form, of a phase modulation system according to the invention.

It can be shown that when two carrier frequencies in quadrature relation, for example sine and cosine, are respectively modulated by separate modulating functions, the complex transmitted spectrum can be expressed as follows:

$$e_i=[\sum F_{an}(t)\cos nwt+\sum F_{bn}(t)\sin nwt] \quad (1)$$

where $e_i$ is the instantaneous voltage of the complex modulated wave, $F_{an}(t)$ is a modulating function identified as being associated with a cosine carrier by subscript $a$, $n$ is any integer, $w$ is the angular frequency of a fundamental carrier wave, and $F_{bn}(t)$ is a modulating function identified as being associated with a sine carrier by subscript $b$, then, in order to demodulate the cosine carriers, it is only necessary to multiply by cos $nwt$, and integrate, to obtain a demodulator output current, $$I_o=\frac{\gamma_R w}{2\pi}\int_0^{2\pi/w} e_i(\cos nwt)dt=\frac{\gamma_R F_{an}(t)}{2} \quad (2)$$

while, if it is desired to demodulate one of the sine carriers, the complex wave is multiplied by sin $nwt$, and the result is integrated to obtain $$I_o=\frac{\gamma_R w}{2\pi}\int_0^{2\pi/w} e_i(\sin nwt)dt=\frac{\gamma_R F_{bn}(t)}{2} \quad (3)$$

The factor $\gamma_R$ depends on the characteristics of the demodulating device.

In accordance with one feature of the present invention, the desired modulating functions are produced by special phase converters controlled jointly and simultaneously by the audio frequency or similar input signals, and a local sweep oscillator. Thus by making the angles of the function $F_{an}(t)$ and the function $F_{bn}(t)$ linear with respect to an original modulating signal, and by selection of a suitable form for these two modulating functions $F_{an}(t)$ and $F_{bn}(t)$, satisfactory phase modulation of a carrier frequency can be achieved while employing conventional amplitude modulation techniques.

Inspection of Equation 1 shows that the modulating functions $F_{an}(t)$ and $F_{bn}(t)$ must, in order to specify fully a modulated wave, have a form of the following general nature:

$$F_{an}(t)=\gamma_T E_{kn} G_{an}(t) \quad (4)$$

and $$F_{bn}(t)=\gamma_T E_{kn} G_{an}(t) \quad (5)$$

where $G_{an}(t)$ and $G_{bn}(t)$ are modulating waves, $E_{kn}$ is the carrier amplitude, and $\gamma_T$ is a constant depending on the characteristics of the modulating device. Since there is no restriction on the nature of $F_{an}(t)$ and $F_{bn}(t)$ other than that their rate of change with time must be sufficiently small to permit them to be considered constant during the period of integration, they may in general be any functions of time. For phase modulation purposes, we assign a restricted form to the modulating waves $G_{an}(t)$ and $G_{bn}(t)$ in accordance with the following equations, $$G_{an}(t)=E_{mn}\cos\phi_n \quad (6)$$

and $$G_{bn}(t)=E_{mn}\sin\phi_n \quad (7)$$

where $E_{mn}$ is the amplitude of the modulating wave and $\phi_n$ is the independent variable, the value of which is controlled by the modulating voltage being transmitted. Then the modulating functions become $$F_{an}(t)=\gamma_T E_{kn} E_{mn}\cos\phi_n=E_{on}\cos\phi_n \quad (8)$$

and $$F_{bn}(t)=\gamma_T E_{kn} E_{mn}\sin\phi_n=E_{on}\sin\phi_n \quad (9)$$

where $E_{on}$ is used in place of $\gamma_T E_{kn} E_{mn}$ for the sake of simplicity of notation, and is the maximum amplitude of the modulated envelope. For the moment we need not concern ourselves with the exact relation between $\phi_n$ and the modulating voltage, but merely note that if the modulation process has been carried out in accordance with these relationships, so that the transmitted wave is of the form, $$e_i=[\Sigma E_{on}\cos\phi_n\cos nwt+\Sigma E_{on}\sin\phi_n\sin nwt] \quad (10)$$

then the original phase-dependent modulating functions can be recovered at the receiving terminal by multiplying by a wave having the same frequency and phase as the carrier, and integrating, in the manner of Equations 2 and 3, which are here written in the following form:

$$I_o=\frac{\gamma_R w}{2\pi}\int_0^{2\pi/w} e_i(\cos nwt)\,dt=\frac{\gamma_R E_{on}\cos\phi_n}{2} \quad (11)$$

and $$I_o=\frac{\gamma_R w}{2\pi}\int_0^{2\pi/w} e_i(\sin nwt)\,dt=\frac{\gamma_R E_{on}\sin\phi_n}{2} \quad (12)$$

A broad application of this principle to phase modulation in general is obtained by expanding Equation 10 in accordance with the trigonometric identity.

$$\cos A\cos B+\sin A\sin B=\cos(A-B) \quad (13)$$

which leads immediately to the equation, $$e_i=[\Sigma E_{on}\cos\phi_n\cos nwt+\Sigma E_{on}\sin\phi_n\sin nwt]$$
$$=\Sigma E_{on}\cos(nwt-\phi_n) \quad (14)$$

This equation states in effect that if a carrier wave is amplitude modulated by a modulating function to produce a first modulation product, and if the same carrier wave in quadrature is amplitude-modulated by the same modulating function also in quadrature, to form a second modulation product; then the sum of the first and second modulation products is a phase-modulated wave. The importance of the relationship resides in the fact that the actual modulation process in which the modulating function is impressed on the carrier involves amplitude modulation only. Conventional and simple amplitude modulators may therefore be employed in the radio-frequency section to produce the required phase modulation. The preparation of the necessary modulating functions to be applied to the amplitude modulators may be carried out at modulating frequencies.

It remains, of course, to determine just what sort of modulating function we need to create in order to produce, through this process, a phase-modulated wave in which the phase deviation is a linear function of the fundamental modulating voltage, $e_{mn}$. It is immediately seen that the primary requirement is expressed by the equation, $$\phi_n=ke_{mn} \quad (15)$$

where $k$ is a constant depending on the structure of the device employed to set up the modulating function. Since the modulating waves required at the output of this device are specified by Equations 6 and 7, we immediately have, by substitution of (15) in these equations, the requirement that the output of the device, which might be called a "phase converter" must be $$G_{an}(t)=E_{mn}\cos ke_{mn} \quad (16)$$

and $$G_{bn}(t)=E_{mn}\sin ke_{mn} \quad (17)$$

Under these conditions, the equation of the modulated wave becomes $$e_i=\Sigma E_{on}\cos(nwt-ke_{mn}) \quad (18)$$

which is the equation of a phase-modulated wave having a phase deviation proportional to the modulating voltage.

Summarizing the requirements of this type of phase-modulation system, it is seen that the first step is the generation, by means of phase converters, of two modulating waves, the instantaneous values of which are proportional respectively to the cosine and to the sine of an angle which in turn is proportional to the modulating voltage. These two modulating waves are used respectively to amplitude-modulate a cosine carrier and a sine carrier, and the outputs of the amplitude modulators are added. The result is a phase-modulated wave in which the phase deviation is proportional to the original modulating voltage.

Referring to Fig. 1 of the drawing, the block 10 represents any well-known source of modulating voltages, such for example as a voice frequency or audio frequency voltage source. This signal voltage is represented as $e_{mn}$ and is impressed in parallel on a cosine phase converter 11 and a sine phase converter 12. The devices 11 and 12 are supplied with a local sweep frequency from a sweeping oscillator 13 of any well-known type, such for example as a Hartley, Colpitts, or tuned grid-tuned plate oscillator. This oscillator may, for example, have a fundamental frequency of one megacycle per second. The device 11 provides at its output the modulating function $G_{an}(t)=E_{mn}\cos k\cdot e_{mn}$, which is identical with Equation 16 explained hereinabove; while the device 12 produces at its output the modulating function $G_{bn}(t)=E_{mn}\sin k\cdot e_{mn}$, which, it will be observed, is the same as Equation 17 explained hereinabove.

The modulating function $G_{an}(t)$ is applied to a balanced amplitude modulator 13*a*, and the modulating function $G_{bn}(t)$ is applied to a similar balanced amplitude modulator 14. The modulators 13*a* and 14 are also fed in the usual balanced relation from a local carrier source 15 having appropriate phasing networks to produce tow equal-frequency carrier outputs, but with the outputs in quadrature phase relation. For a detailed disclosure of a balanced amplitude modulator, reference may be had to the "Radio Engineers' Handbook" by F. E. Terman, first edition, second impression, page 551, Figure 22, and likewise for a detailed disclosure of the carrier source and phasing networks represented by block 15, reference may be had to the same volume, page 480, Figure 1(*a*), and page 949, Figure 56(*a*), respectively. The carrier output $E_{kn}$ cos (*nwt*) is fed to modulator 13*a*, while the carrier $E_{kn}$ sin (*nwt*) is applied to the balanced modulator 14. There is produced at the output of modulator 13*a*, a modulated wave $E_{on}$ cos $ke_{mn}$ cos (*nwt*), and there is produced at the output of modulator 14, a modulated wave $E_{on}$ sin $ke_{mn}$ sin (*nwt*). These two outputs are then added to produce at the output terminals 16, 17, a phase-modulated carrier $E_{on}$ cos ($nwt-ke_{mn}$), wherein the phase angle deviation of the carrier is a linear function of the signal input voltage $e_{mn}$.

Figure 2:
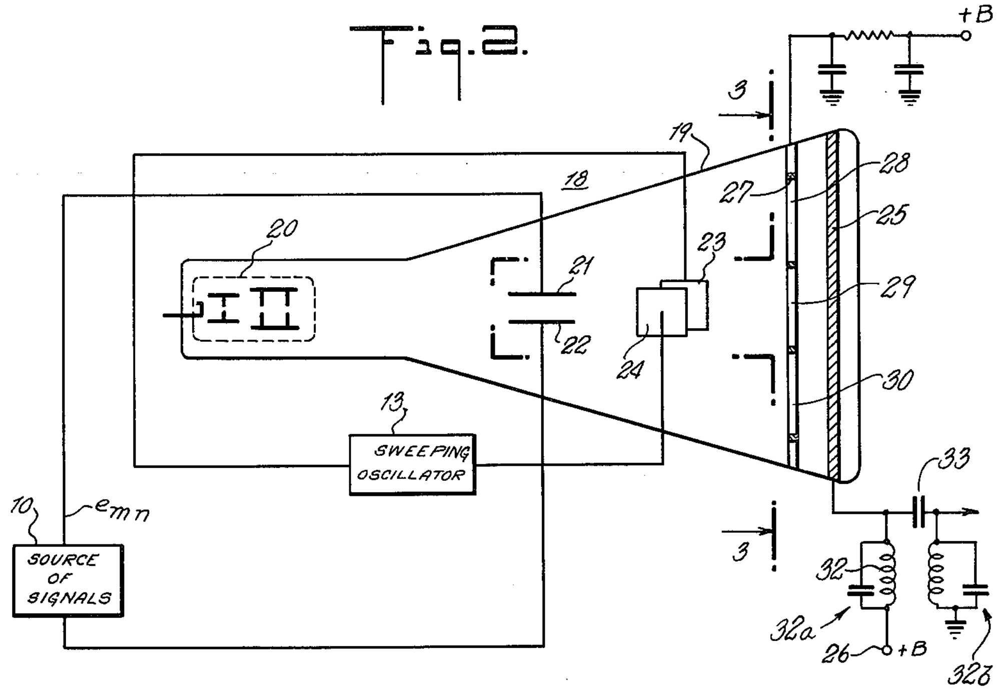
Fig. 2 is a schematic diagram of a phase converter according to the invention.

Fig. 2 is a schematic diagram of a phase converter adapted to produce the modulating functions defined by Equations 16 and 17, and which may be used to control the generation of the required phase-modulated wave wherein $ke_{mn}$ is the phase displacement of the final carrier. This converter consists of a cathode-ray tube 18 having the usual evacuated enclosing envelope 19 provided with the usual electron gun 20 for developing a focussed beam of electrons. This beam is arranged to be deflected in substantially perpendicular directions, for example by the usual horizontal beam-deflecting plates 21, 22, and the usual vertical beam-deflecting plates 23, 24. Mounted adjacent the enlarged end of the envelope 20 is a flat metal plate anode 25 which is connected to a suitable high voltage terminal 26 on the conventional direct current power supply used with cathode-ray tubes. Mounted in spaced relation to the anode 25 on the side facing the electron gun, is an apertured mask electrode 27 having a series of specially-shaped apertures 28, 29, 30, etc. While the drawing shows three such apertures, it will be understood that a greater or less number can be used, depending uopn the maximum phase deviation that is required in the phase-modulated carrier.

Figure 3:
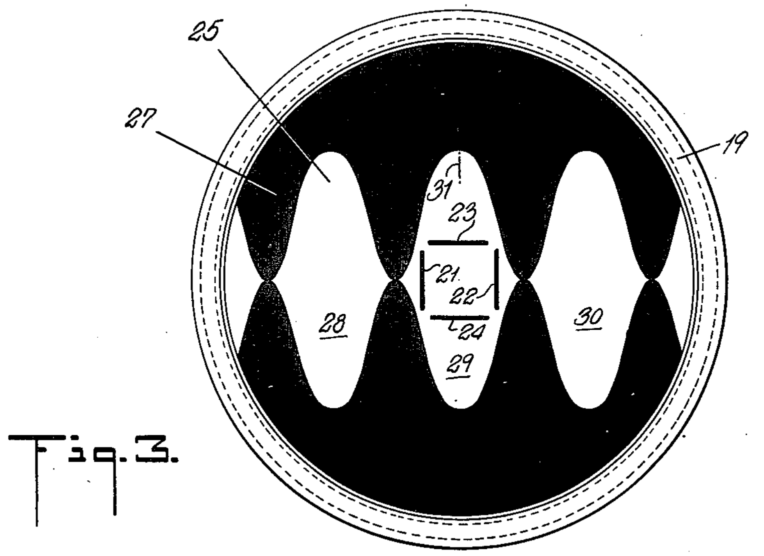
Fig. 3 is a sectional view of the tube of Fig. 2, taken along the line 3—3 thereof.

The radio frequency sweeping oscillator 13 is connected across the vertical plates 23, 24, while the source 10 of the input signals is connected across the horizontal deflecting plates 21, 22. When the input signal voltage $e_{mn}$ is zero, the beam oscillates in a vertical plane along the center line of the mask as represented by the dot-dash line 31 (Fig. 3) under the influence of the deflecting voltage from the oscillator 13. If in this condition of the beam, the total deflection amplitude in opposite vertical directions with respect to the center of the aperture 29 is equal to the central length of the aperture, the beam will not be intercepted by mask 27, and therefore a constant flow of electrons will arrive at the anode 25 throughout each complete cycle of source 13. If the signal $e_{mn}$ is slightly increased, for example to move the electron beam to the right or to the left of center, the beam will be intercepted by mask 27 before it has reached its maximum deflection either upwardly or downwardly. The current to anode 25 will therefore be interrupted for an interval before the end of the first quarter of the radio frequency cycle from source 13; the anode current however will be re-established some time after the end of the first-quarter cycle, and then it will again be interrupted before the end of the third-quarter cycle, and again re-established some time after the end of the third-quarter cycle. The average value of the anode current throughout each radio frequency cycle of oscillator 13 will therefore be somewhat less than the anode current under the condition when the beam is oscillating up and down in the horizontal center of the tube.

The anode 25 can be connected to a suitable integrating device or network which may be a filter comprising for example band-pass sections 32*a*, 32*b*, coupled by condenser 33 so that the output of the anode circuit is proportional to the average value of the anode current during each radio frequency sweep cycle, while keeping direct current away from the output, as well as keeping away from the output the high frequencies produced by the beam sweeping back and forth under control of the sweep generator. By properly designing the shape or outline of the mask apertures, it is possible to produce an output voltage having a function which is proportional to a large variety of functions of the signal modulating voltage $e_{mn}$. As above pointed out, it is desired to produce an output voltage $$e_{pn}=G_{an}(t)=E_{mn}\cos ke_{mn} \qquad (19)$$

or $$e_{pn}=G_{bn}(t)=E_{mn}\sin ke_{mn} \qquad (20)$$

in accordance with Equations 16 and 17.

Considering for the time being Equation 19 only, it is now necessary to determine the shape of the mask which will produce this output function. We first assume that the radio frequency deflecting voltage is sinusoidal in character, the vertical deflection, *y*, being represented by the expression $$y=A\sin w_y t \qquad (21)$$

where A is the maximum amplitude of the deflection, and $w_y$ is the angular frequency of the radio frequency wave.

The anode current during the intervals when the anode is not masked is $$I_a=\frac{dQ}{dt} \qquad (22)$$

where Q is the quantity of electricity existing in the circuit at time *t*.

The average current during a time interval T is $$I_{avg}=\frac{Q}{T} \qquad (23)$$

and since from (22)

$$Q=\int_0^{T_Y} I_a dt \qquad (24)$$

where $T_Y$ is the time when current ceases to flow, we have $$I_{avg}=\frac{1}{T}\int_0^{T_Y} I_a dt \qquad (25)$$

In this case, the anode current $I_a$ is a known and constant quantity, being the normal anode current of the tube when the beam is not intercepted by the mask. The value of average current I is changed by changing the period of time during which the normal anode current flows, and this, in effect, changes the integration limits. Since $I_a$ is a constant, we can write, for the average current, $I_x$ at a horizontal displacement X $$I_x=\frac{I_a}{T}\int_0^{T_Y} dt=\frac{I_a T_Y}{T} \qquad (26)$$

It is now evident that, since the configuration of the mask is symmetrical, we need take the average over only one-quarter cycle of the radio frequency deflecting wave, all other quarter cycles being identical. In other words, the time interval over which the integration is carried out is $$T=\frac{1}{4}\cdot\frac{2\pi}{w_y}=\frac{\pi}{2w_y} \qquad (27)$$

Then the average current is, by substitution in (26)

$$I_x=\frac{2I_aT_Yw_y}{\pi} \quad (28)$$

It is now necessary to express the time $T_Y$ at which the beam is cut off in terms of the vertical displacement of the beam, in order to determine the required vertical distance Y from the horizontal center line to the edge of the mask, at horizontal displacement X. Returning to Equation 21, we find that the time at which the beam is displaced a vertical distance $y$ is $$t=\frac{1}{w_y}\sin^{-1}\frac{y}{A} \quad (29)$$

Then the time $T_Y$ at which the beam is displaced vertically a distance Y to the edge of the mask is $$T_Y=\frac{1}{w_y}\sin^{-1}\frac{Y}{A} \quad (30)$$

Substituting (30) in (28) we have $$I_x=\frac{2I_a}{\pi}\sin^{-1}\frac{Y}{A} \quad (31)$$

It is seen from this equation that if the edge of the mask coincides with the maximum beam deflection, so that $Y=A$, the average anode current is $$I_x=\frac{2I_a}{\pi}\sin^{-1}(1)=\frac{2I_a}{\pi}\cdot\frac{\pi}{2}=I_a \quad (32)$$

while if $Y=0$, corresponding to complete extinction of the beam $$I_x=\frac{2I_a}{\pi}\sin^{-1}(0)=0 \quad (33)$$

It is now required so to choose Y as a function of X in Equation 31 that $I_x$ will be a cosine function of X. It is immediately seen that $I_x$ cannot be a perfect cosine function of X, because the beam current can never be negative. Instead, we set up as the objective which we wish to produce, the equation $$I_x=\frac{I_{mn}}{2}\left(1+\cos\frac{2\pi X}{\lambda}\right) \quad (34)$$

where $I_{mn}$ is the amplitude of the output current wave, and λ is the distance between successive crests of the mask configuration. This is, of course, the equation of a direct current with a cosine wave of the same amplitude superimposed on it. The direct current can be filtered off later leaving the required cosine function. Then we have, from Equation 31

$$\frac{2I_a}{\pi}\sin^{-1}\frac{Y}{A}=\frac{I_{mn}}{2}\left(1+\cos\frac{2\pi X}{\lambda}\right) \quad (35)$$

Simplifying this relationship, we obtain, for the equation of the edge of the mask $$Y=A\sin\left[\frac{\pi I_{mn}}{4I_a}\left(1+\cos\frac{2\pi X}{\lambda}\right)\right] \quad (36)$$

The output current wave given by Equation 34 is now passed through a filter to eliminate the direct current. The alternating current component sets up a voltage wave with an amplitude $E_{mn}$ across the load impedance, to produce an instantaneous voltage wave $$e_{pn}=E_{mn}\cos\frac{2\pi X}{\lambda} \quad (37)$$

The actual X deflection produced is a function of the deflecting voltage in accordance with the following relationship $$X=Ce_{mn} \quad (38)$$

where C is a constant expressing the number of centimeters deflection per volt. We then have $$e_{pn}=E_{mn}\cos\frac{2\pi Ce_{mn}}{\lambda} \quad (39)$$

and if we define the constants involved in accordance with the equation $$\frac{2\pi C}{\lambda}=k \quad (40)$$

we obtain the final required result, $$e_{pn}=E_{mn}\cos ke_{mn} \quad (19)$$

In a similar manner, it is found that the equation of the mask edge required to produce the sine modulating function of Equation 20 is $$Y=A\sin\left[\frac{\pi I_{mn}}{4I_a}\left(1+\sin\frac{2\pi X}{\lambda}\right)\right] \quad (41)$$

Figure 4:
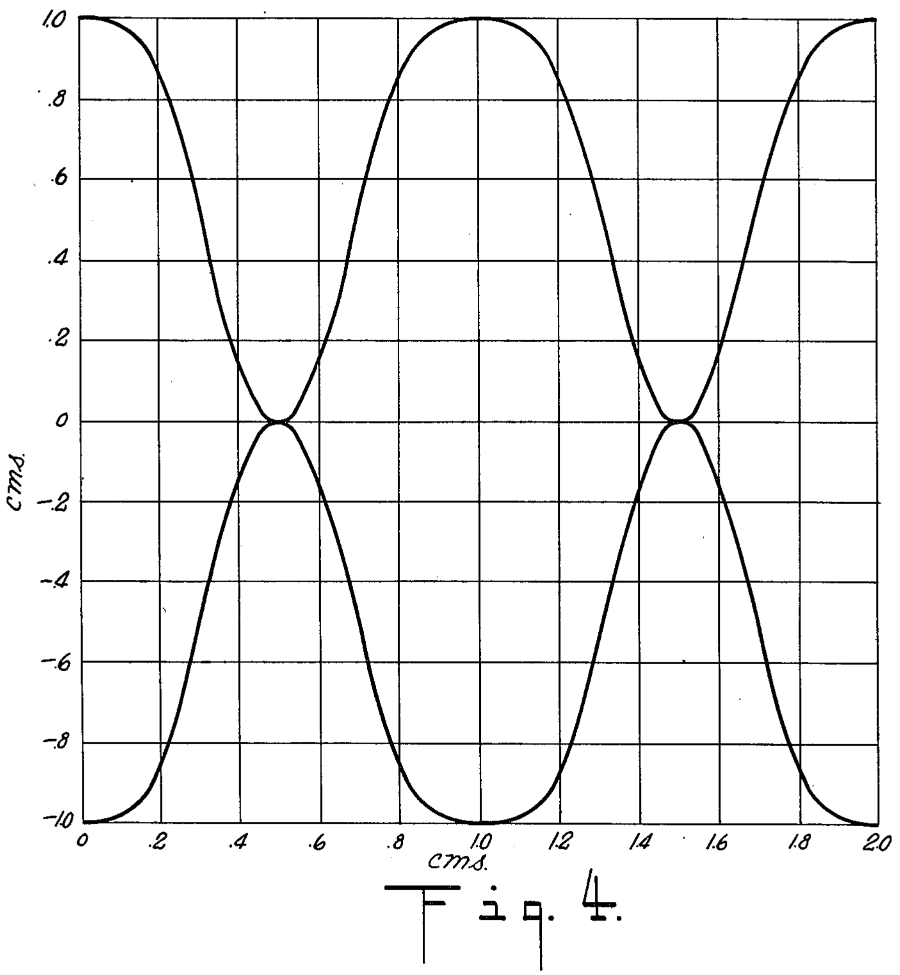
Fig. 4 is a graph explanatory of the operation of the tube of Fig. 2.

Fig. 4 is a graph showing the outlines of the edge of the mask in the cosine phase converter. In plotting this curve, Equation 36 has been simplified by making the following assumptions;

$$I_{mn}=I_a \quad (42)$$

This assumption results in the sweeping beam barely reaching the edge of the mask when $X=0$.

$$A=1 \text{ centimeter} \quad (43)$$

$$\lambda=1 \text{ centimeter} \quad (44)$$

The diameter of the beam at the anode might reasonably be supposed to be not more than 1 milimeter, and under these conditions it appears that a complete cycle along the horizontal axis might occupy a space of not more than 1 centimeter; without causing non-linearity. This matter needs to be investigated further experimentally.

Under these conditions, Equation 36 reduces to $$Y=\sin\left[\frac{\pi}{4}(1+\cos 2\pi X)\right] \quad (45)$$

which is the function plotted in Fig. 4. Equation 37 also becomes $$e_{pn}=E_{mn}\cos 2\pi X \quad (46)$$

Similarly, the equation of the edge of the mask in the sine phase converter, making the same assumptions regarding the values of A and λ, becomes $$Y=\sin\left[\frac{\pi}{4}(1+\sin 2\pi X)\right] \quad (47)$$

and the output voltage of the sine phase converter is $$e_{pn}=E_{mn}\sin 2\pi X \quad (48)$$

From Fig. 4, and Equations 46 and 48, it is evident that the wave goes through a complete cycle (2π radians) of phase deviation as the beam sweeps to the right or left a distance of 1 centimeter. With existing oscilloscopes it is no problem to maintain a linear relation between deflecting voltage and beam displacement for displacements from the center line as large as 5 inches or 12.5 centimeters. It therefore seems probable that with this system, phase deviations as high as ±25π radians may be achieved.

Figure 5:
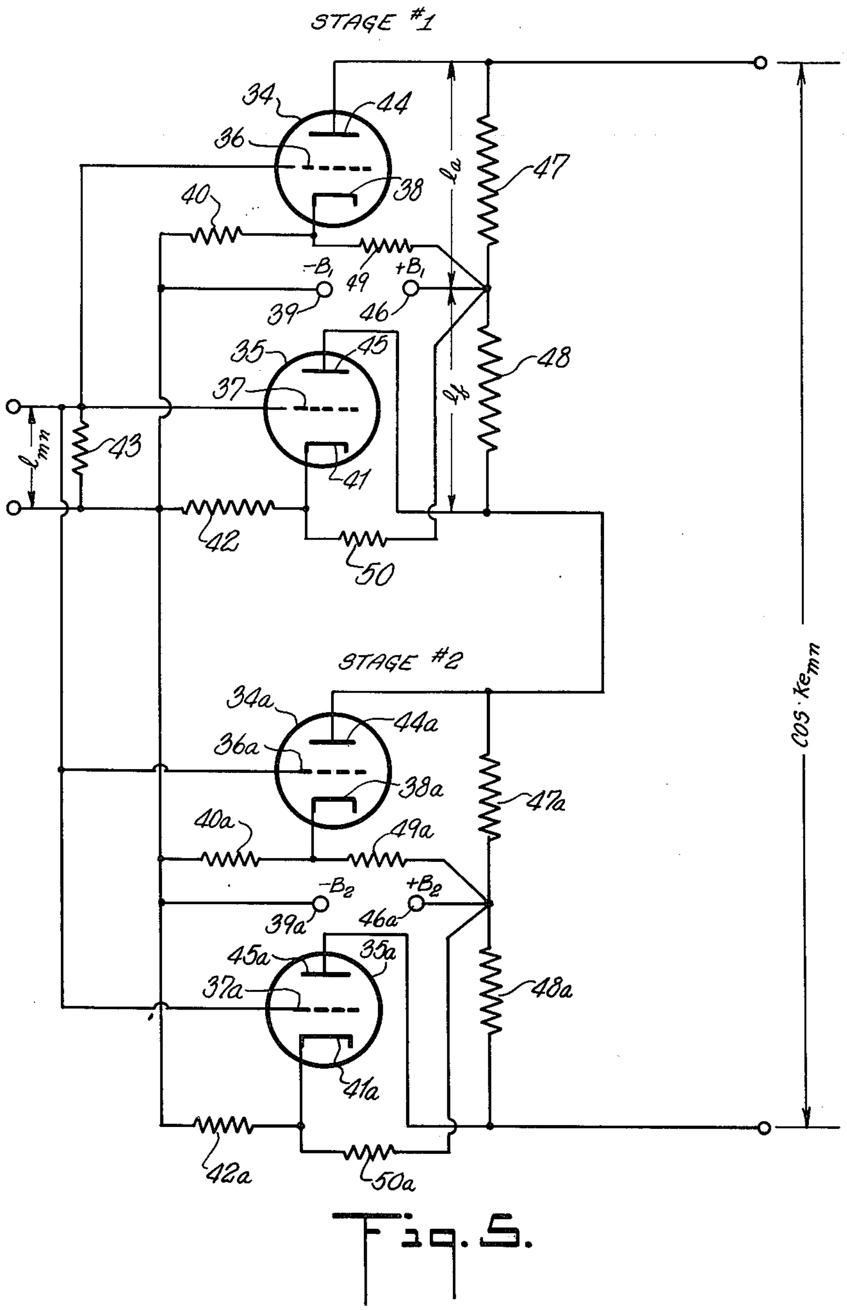
Fig. 5 is a schematic illustration of a modified form of phase converter.

Instead of using phase converters of the cathode-ray beam type to derive the sine and cosine modulating functions according to Equations 16 and 17 above-mentioned, a combination of evacuated grid-controlled electron tubes can be used. Such an arrangement is schematically illustrated in Fig. 5. The tubes in each phase converter are arranged in one or more stages, depending upon the total amount of phase deviation multiplication required in the phase-modulated carrier.

Referring to Fig. 5 which shows a cosine phase converter, the first stage thereof may comprise a pair of tubes 34, 35, upon whose control grids 36, 37, the input modulating signal $e_{mn}$ is impressed. The cathode 38 is returned to the common negative terminal 39 of the direct current power supply through a relatively small cathode load or bias resistor 40; while cathode 41 is returned to the common negative terminal 39 through a relatively large cathode load resistor 42. A common input or grid-leak resistor 43 is provided for both tubes. The anodes or plates 44, 45, are connected to the positive terminal 46 of the direct current power supply through respective equal resistors 47, 48, and also to the cathodes through respective voltage divider resistors 49, 50, so as to provide the normal flow of biasing current through resistors 40, 42, independent of the plate current of the respective tubes, which are normally at plate current cut-off.

Figure 6:
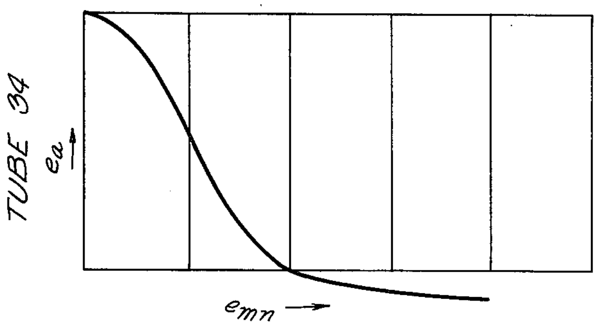
Figs. 6, 7 and 8 are graphs explanatory of the converter of Fig. 5.
Figure 7:
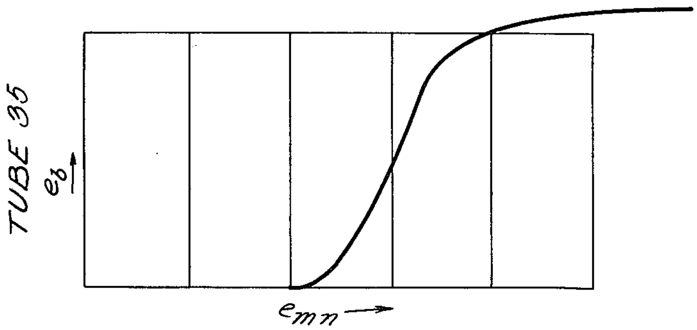
Figure 8:
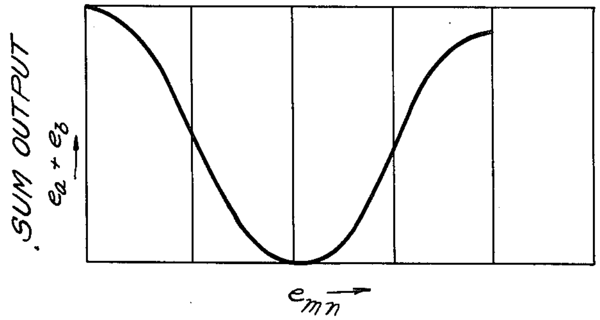

When the input signal voltage $e_{mn}$ is zero, tube 34 is biased just beyond plate current cut-off by the drop in resistor 40, and tube 35 is biased by resistor 42 a great deal beyond plate current cut-off. As the voltage $e_{mn}$ begins to rise, it causes plate current to flow through tube 34, but tube 35 does not pass plate current until tube 34 reaches plate current saturation. The relations of the plate voltages of the two tubes are shown in the respective graphs of Figs. 6 and 7. The combined output of the two tubes is then as indicated by the graph of Fig. 8, and represented by the expression ($\cos ke_{mn}$). Any desired number of cycles of phase shift can be produced by adding similar cascaded stages, such as stage #2 wherein the elements are the same as those of the stage #1 but with the suffix "*a*" applied thereto. In other words, the inputs to the two stages are fed in parallel and their outputs are combined in series.

When it is desired to obtain the corresponding sine function ($\sin ke_{mn}$), a similar arrangement to that of Fig. 5 may be used, but with higher normal cathode biasing voltages on the tubes to delay the start of the cycle by 90 degrees. The only difference then is that the sine converter uses bias resistors 40, 42, **40*a*, 42*a*, of much higher value than the corresponding resistors 40, 42, 40*a*, 42*a***, of Fig. 5.

Figures 9, 9A, 10:
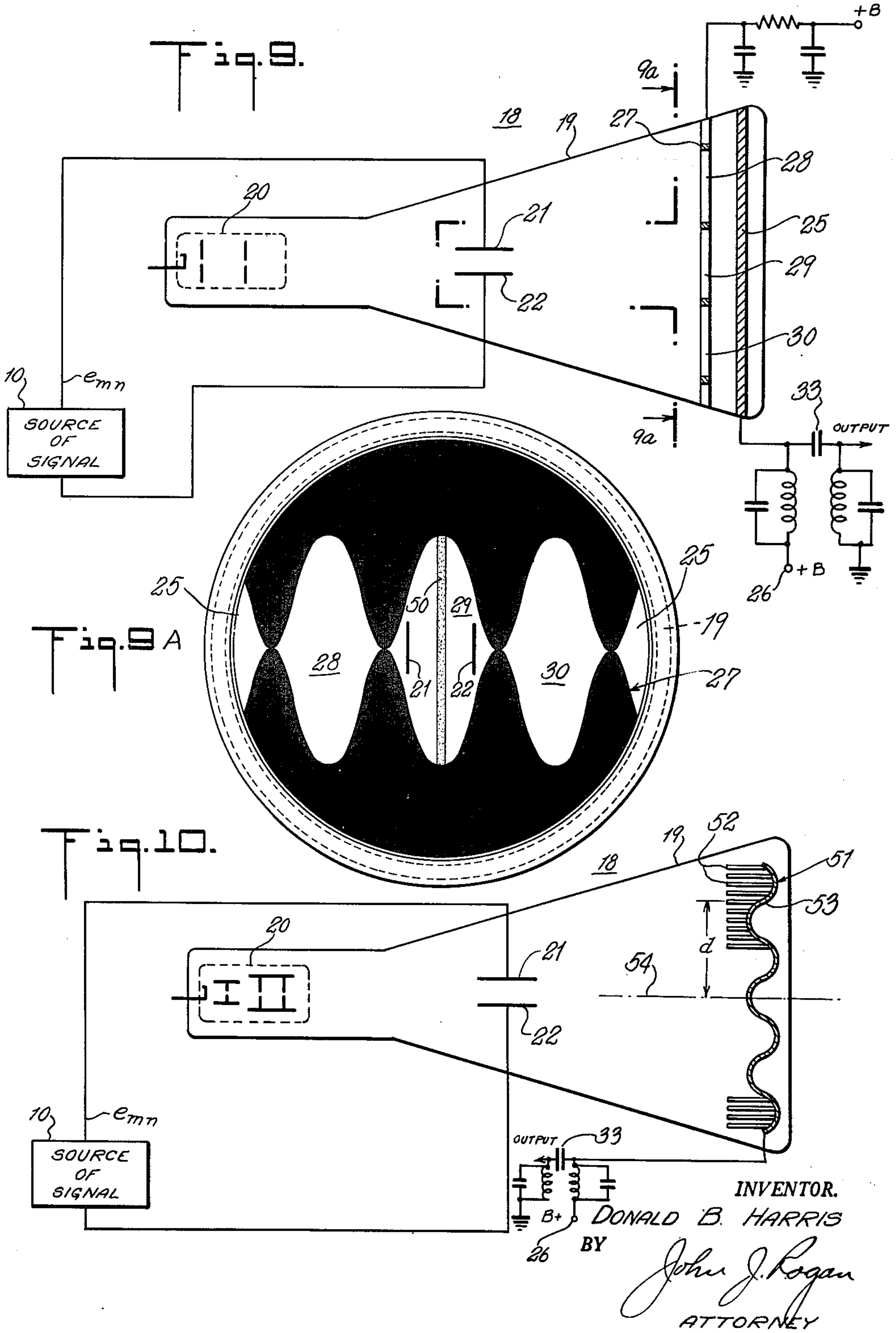
Figs. 9, 9A and 10 are further modifications of the phase converter of Fig. 2.

Fig. 9 shows a modification of Fig. 2, and wherein only one set of beam deflector plates is used. The electron gun 20, instead of developing a cathode-ray beam focussed to a point or spot which is swept vertically along a line, may directly develop a beam in the form of a focussed line 50 which is normally at the center of the aperture 29 (Fig. 9A). The remaining parts of Figs. 9 and 9A are the same as the corresponding parts of Figs. 2 and 3, and are designated alike in both sets of figures. The action of the converter of Fig. 9 is substantially the same as that described above in connection with Fig. 2. The signal voltages impressed on plates 21, 22, will deflect the line of electrons 50 so as to be variably intercepted by the edges of the aperture 29 in mask 27, to produce at the anode 25 a voltage which is a cosine function of the input signal $e_{mn}$. The sine function of the input voltage $e_{mn}$ can then be developed by a similar phase converter, but with the beam being intercepted by a mask having apertures designed in accordance with the above Equations 47 and 48.

Fig. 10 shows another modified form of the phase converter which may be similar to that of Fig. 9, except that the electrodes 25 and 27 are replaced by the mosaic electrode 51. The remaining parts of Fig. 10 which are identical with those of Fig. 9, bear the same designation numerals. The electrode 51 consists of a series of individual anode targets 52 which are suitably applied or attached in equal spaced relation to a metal backing 53. The targets 52 are of different lengths "L," with each target length being proportional to a cosine function of the distance D between that target and the center line 54 of the target. One convenient way of accomplishing this result, is to make the plate 53 of thin metal strip which is corrugated or sinuously curved, and to make the individual targets 52 of the same resistance material. The backing 53 can then be connected to the anode supply terminal 26. Consequently the voltage that appears at the output of the system, will depend upon the particular target upon which the cathode-ray beam is impinging, and since the length and resistance of each target vary with its distance from the center line of the anode, the desired sinusoidal function can be obtained. A similar converter can be used to derive the cosine function. In other words, in the sine converter, the lengths of the several targets 52 will correspond in a sinusoidal relation with their respective distances from the center line 54, whereas in the cosine converter the lengths of these targets 52 will vary in length in a cosine relation with respect to their distances from the said center line 54. If desired, both sets of targets may be mounted within the same evacuated envelope 19 and each of course provided with a separate output circuit similar to that illustrated in Fig. 10. In that event, either two separate oscillating cathode-ray beams may be employed, or the same beam may be of sufficient length to simultaneously sweep both sets of mosaic targets. This also applies to the embodiments of Figs. 2 and 9.

While particular embodiments have been described and disclosed herein, it will be understood that this is done merely for purposes of explanation of preferred forms of the invention, and that various changes and modifications may be made therein without departing from its spirit and scope.

What is claimed is:

1. The method of phase modulation of a carrier under control of a source of variable amplitude signal voltage, which comprises amplitude-modulating a sine function carrier wave by a voltage having a sine modulating function controlled by said signal voltage to produce a first modulation product, amplitude-modulating a cosine function carrier by another voltage having a cosine modulating function also controlled by said signal voltage to produce another modulation product, and adding said modulation products to produce a phase-modulated output carrier wherein the phase modulations are correlated with said signal voltage.

2. A carrier phase-modulation system, comprising a source of variable amplitude signal voltage, a cosine phase converter, a sine phase converter, means to apply said signal voltage to said converters to produce two separate voltages having modulating functions respectively related by the sine and cosine of an angle corresponding to said signal voltage, a carrier source, means to derive from said carrier source two separate but equal-frequency components which are respectively related by sine and cosine functions, a first amplitude modulator upon which are impressed the cosine function of said modulating voltage and the cosine function of said carrier to produce a modulation product represented by the product of the impressed functions, a second amplitude modulator upon which are impressed the sine function of said modulating voltage and the sine function of said carrier to produce another modulation product represented by the product of the impressed sine functions, and means to add said modulation products to produce a phase-modulated carrier wherein the phase modulations are correlated with said signal voltage.

3. An arrangement according to claim 2, in which each of said phase converters comprises a cathode-ray tube having an apertured beam-masking electrode, an electron gun for developing an electron beam, and means to sweep said beam across said aperture at a predetermined rate.

4. An arrangement according to claim 2, in which each of said phase converters comprises a cathode-ray tube having an electron gun for developing a cathode-ray beam, and a beam intercepting mask electrode having a series of similarly shaped apertures, and means to sweep said beam across said apertures in accordance with the amplitude of said signal voltage.

5. An arrangement according to claim 2, in which each of said phase converters comprises a cathode-ray tube having an electron gun for developing an electron beam, an apertured beam intercepting mask electrode, and means including said source of signal voltage for causing said beam to sweep in mutually coordinate directions with respect to the boundary of the mask aperture.

6. An arrangement according to claim 2, in which each of said phase converters comprises a cathode-ray tube having means to develop a beam of electrons which is focussed to a point, an apertured beam intercepting mask electrode, a local source of sweep frequency for sweeping said beam in one direction with respect to said aperture, and means including said signal voltage for sweeping the beam in a transverse direction with respect to said aperture.

7. An arrangement according to claim 2, in which each of said phase converters comprises a cathode-ray tube having means to develop a beam of electrons which is focussed in a narrow line, an apertured beam intercepting mask electrode, and means to sweep said line transversely with respect to the aperture in said mask electrode.

8. An arrangement according to claim 2, in which each of said phase converters comprises a cathode-ray tube having means to develop a beam of electrons, an anode upon which the beam impinges, means to sweep said beam across one dimension of said anode, said anode having a varying resistance in said direction to produce an output voltage whose amplitude is determined by the position of the beam on the anode and the resistance of the anode at said position.

9. An arrangement for producing a phase-modulated carrier, comprising a source of signal voltage, a pair of phase converters upon which said signal voltage is simultaneously impressed to produce two separate modulating voltages which are in quadrature phase, means to generate two equal-frequency carriers also of quadrature phase, means to amplitude-modulate said carriers respectively by said modulating voltages, and means to combine the modulated carriers to produce an output carrier whose phase is modulated to correspond with said signal voltage, and in which each of said phase converters comprises a pair of grid-controlled electron tubes, means for biassing the control grids of the tubes to different levels so that one tube does not become plate current conductive until the other tube is at plate current saturation.

10. An arrangement for producing a phase-modulated carrier, comprising a source of signal voltage, a pair of phase converters upon which said signal voltage is simultaneously impressed to produce two separate modulating voltages which are in quadrature phase, means to generate two equal-frequency carriers also of quadrature phase, means to amplitude-modulate said carriers respectively by said modulating voltages, and means to combine the modulated carriers to produce an output carrier whose phase is modulated to correspond with said signal voltage, and in which each of said phase converters comprises a pair of grid-controlled electron tubes, means normally biassing one tube close to plate current cut-off, means biassing the other tube substantially beyond plate current cut-off, said other tube being plate conductive only when the first tube reaches plate current saturation, and means to combine the outputs of said tubes in phase opposition.

11. An arrangement according to claim 10, and in which each phase converter comprises a series of similar cascaded stages with the number of stages determined by the total phase deviation desired in the phase-modulated carrier.

12. The method of deriving a phase-modulated carrier under control of a source of original variable-amplitude signal voltage, which comprises converting the signal voltage into two separate equal-frequency voltages one of which is a sine function of the signal voltage and the other a cosine function of the signal voltage, generating two equal-frequency carriers in respective quadrature phase one of which carriers is a cosine function with respect to the other carrier, amplitude-modulating the sine carrier by said sine function of the signal voltage, amplitude-modulating the cosine carrier by said cosine function of the signal voltage, and combining the modulated carriers to produce a phase-modulated output carrier.

DONALD B. HARRIS.

References Cited in the file of this patent

UNITED STATES PATENTS

| Number | Name | Date |
|---|---|---|
| 2,020,409 | Green | Nov. 12, 1935 |
| 2,083,747 | Runge | June 15, 1937 |
| 2,151,464 | Curtis | Mar. 21, 1939 |
| 2,210,968 | Wirkler | Aug. 13, 1940 |
| 2,335,934 | Goldstine | Dec. 7, 1943 |
| 2,380,947 | Crosby | Aug. 7, 1945 |
| 2,424,971 | Davey | Aug. 5, 1947 |
| 2,431,569 | Labin | Nov. 25, 1947 |
| 2,451,796 | Berkoff | Oct. 19, 1948 |
| 2,545,955 | Hopkins | Mar. 20, 1951 |